United States Patent
Zhang et al.

(10) Patent No.: US 10,996,715 B2
(45) Date of Patent: May 4, 2021

(54) DISPLAY DEVICE AND MANUFACTURING METHOD THEREOF

(71) Applicants: Beijing BOE Display Technology Co., Ltd., Beijing (CN); BOE Technology Group Co., Ltd., Beijing (CN)

(72) Inventors: Qiang Zhang, Beijing (CN); Xiang Feng, Beijing (CN); Wenting Tian, Beijing (CN); Yalong Su, Beijing (CN); Bingqiang Gui, Beijing (CN); Xiaoru Liu, Beijing (CN); Zhaokun Yang, Beijing (CN); Sha Liu, Beijing (CN); Xiao Sun, Beijing (CN); Yun Qiu, Beijing (CN)

(73) Assignees: Beijing BOE Display Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 111 days.

(21) Appl. No.: 16/481,177

(22) PCT Filed: Nov. 29, 2018

(86) PCT No.: PCT/CN2018/118214
§ 371 (c)(1),
(2) Date: Jul. 26, 2019

(87) PCT Pub. No.: WO2019/205630
PCT Pub. Date: Oct. 31, 2019

(65) Prior Publication Data
US 2021/0041916 A1    Feb. 11, 2021

(30) Foreign Application Priority Data
Apr. 24, 2018    (CN) .......................... 201810372250.6

(51) Int. Cl.
*G06F 1/16* (2006.01)

(52) U.S. Cl.
CPC .......... *G06F 1/1652* (2013.01); *G06F 1/1622* (2013.01); *G06F 1/1641* (2013.01)

(58) Field of Classification Search
CPC ..... G06F 1/1652; G06F 1/1622; G06F 1/1641
See application file for complete search history.

(56) References Cited

U.S. PATENT DOCUMENTS 9,515,099 B2 * 12/2016 Kwon ................. H01L 27/1222
9,769,919 B2 *  9/2017 Park .................... H01L 51/0097
(Continued)

FOREIGN PATENT DOCUMENTS

CN    103475756 A    12/2013
CN    105677227 A     6/2016
(Continued)

OTHER PUBLICATIONS

Chinese Office Action dated Sep. 30, 2020 for corresponding application CN 201810372250.6.
(Continued)

*Primary Examiner* — Abhishek M Rathod
(74) *Attorney, Agent, or Firm* — Arent Fox LLP; Michael Fainberg

(57) ABSTRACT

The present disclosure discloses a display device and a manufacturing method thereof. The display device includes a middle frame and an indiscrete flexible display panel bending around the middle frame. The flexible display panel includes a main display panel region on one side of the middle frame, an auxiliary display panel region on another side of the middle frame, and a bending region bending around the middle frame to connect the main display panel region with the auxiliary display panel region.

14 Claims, 13 Drawing Sheets

(56) References Cited

U.S. PATENT DOCUMENTS

| | | | |
|---|---|---|---|
| 10,135,013 B2* | 11/2018 | Andou | H01L 51/0097 |
| 10,791,206 B2* | 9/2020 | Lee | H04M 1/0266 |
| 2013/0141847 A1 | 6/2013 | Ryu | |
| 2014/0049449 A1 | 2/2014 | Park et al. | |
| 2015/0015511 A1 | 1/2015 | Kwak et al. | |
| 2015/0346991 A1 | 12/2015 | Kwak et al. | |
| 2016/0093685 A1* | 3/2016 | Kwon | H01L 27/3276 |
| | | | 257/40 |
| 2016/0154435 A1 | 6/2016 | Yanagisawa | |
| 2016/0172623 A1 | 6/2016 | Lee | |
| 2017/0229666 A1* | 8/2017 | Tsuruoka | H01L 51/0097 |
| 2017/0330925 A1 | 11/2017 | Tang | |
| 2018/0027673 A1* | 1/2018 | Andou | H01L 51/0097 |
| | | | 361/749 |
| 2018/0211587 A1 | 7/2018 | Yu et al. | |
| 2018/0300696 A1 | 11/2018 | Cui | |
| 2018/0330696 A1* | 11/2018 | Cui | H01L 27/323 |

FOREIGN PATENT DOCUMENTS

| | | |
|---|---|---|
| CN | 105700807 A | 6/2016 |
| CN | 105932036 A | 9/2016 |
| CN | 106504645 A | 3/2017 |
| CN | 106601780 A | 4/2017 |
| CN | 107004698 A | 8/2017 |
| CN | 108563286 A | 9/2018 |
| JP | 2005043641 A | 2/2005 |

OTHER PUBLICATIONS

Chinese Office Action dated Nov. 5, 2019 for corresponding application CN 201810372250.6.

* cited by examiner ical schematic diagram 1 of a display
DISPLAY DEVICE AND MANUFACTURING METHOD THEREOF This application is a US National Stage of International Application No. PCT/CN2018/118214, filed on Nov. 29, 2018, designating the United States and claiming the priority of Chinese Patent Application No. 201810372250.6, filed with the Chinese Patent Office on Apr. 24, 2018, and entitled "display device and manufacturing method thereof". The entire disclosure of each of the applications above is incorporated herein by reference.

FIELD

The present disclosure relates to the field of display technology, and particularly to a display device and a manufacturing method thereof.

BACKGROUND

With the development of electronic devices, dual-screen technology is increasingly applied to various display devices, such as mobile phones, tablet computers, and personal digital assistants (hereinafter "PDAs"). A dual-screen display device has two display panels, which are located on its front and back, respectively, and can be independent from each other. However, use of the two independent display screens has a relatively high design requirement on the entire device and is relatively high in cost.

SUMMARY

Embodiments of the present disclosure provide a display device. The display device includes a middle frame and an indiscrete flexible display panel bending around the middle frame. The flexible display panel includes a main display panel region on one side of the middle frame, an auxiliary display panel region on another side of the middle frame, and a bending region bending around the middle frame to connect the main display panel region with the auxiliary display panel region.

In an embodiment of the disclosure, the middle frame has an opening, and the bending region runs through the opening.

In an embodiment of the disclosure, the opening includes a via hole running through the middle frame or a groove at one end of the middle frame.

In an embodiment of the disclosure, a length of the opening in an extending direction of a border line between the main display panel region and the bending region is equal to a length of the border line between the main display panel region and the bending region.

In an embodiment of the disclosure, a cross-section of a part of the flexible display panel corresponding to the bending region has a semicircular shape or a U shape, where a cutting plane of the cross-section is parallel to a line perpendicular to the middle frame and joining bottom of the part corresponding to the bending region to the middle frame.

In an embodiment of the disclosure, the display device further includes a driver circuit. The auxiliary display panel region includes a display region and a binding region. The binding region is located on a side of the display region away from the bending region. The driver circuit is coupled to the flexible display panel through the binding region, so as to drive the flexible display panel.

In an embodiment of the disclosure, the display device further includes a first transparent cover plate located on a side of the main display panel region away from the middle frame.

In an embodiment of the disclosure, the display device further includes a second transparent cover plate, and a housing on each side surface of the flexible display panel, each side surface of the middle frame and a side of the auxiliary display panel region away from the middle frame. The housing is hollow at a position corresponding to the display region in the auxiliary display panel region, and the second transparent cover plate covers the display region in the auxiliary display panel region.

In an embodiment of the disclosure, the display device further includes a housing located on each side surface of the flexible display panel, each side surface of the middle frame, and a side, away from the middle frame, of the auxiliary display panel region. A part of the housing corresponding to the display region in the auxiliary display panel region is transparent.

In an embodiment of the disclosure, a part, corresponding to the bending region, of the housing is transparent.

In an embodiment of the disclosure, the display device further includes a camera on a part of the housing located on the side, away from the middle frame, of the auxiliary display panel region. A normal projection of the camera on the housing and a normal projection of the auxiliary display panel region on the housing do not overlap.

In an embodiment of the disclosure, a refreshing rate of the main display panel region is different from a refreshing rate of the auxiliary display panel region.

In an embodiment of the disclosure, the side, provided with the auxiliary display panel region, of the middle frame is also provided with a reserved region for mounting a battery. A normal projection of the reserved region on the middle frame and a normal projection of the auxiliary display panel region on the middle frame do not overlap.

A manufacturing method of the display device according to the embodiments of the disclosure includes: providing a flexible display panel and a middle frame; and bending the flexible display panel around the middle frame to divide the flexible display panel into a main display panel region, an auxiliary display panel region and a bending region for connecting the main display panel region with the auxiliary display panel region. The main display panel region and the auxiliary display panel region are located on two sides of the middle frame, respectively.

DETAILED DESCRIPTION OF THE EMBODIMENTS

Embodiments of the disclosure are described below in detail with reference to the accompanying drawings. It should be noted that the embodiments described herein are only a part, instead of all, of the embodiments of the disclosure. Furthermore, in the case of no conflicts, the embodiments of the disclosure and features of the embodiments may be combined with each other. In addition, all other embodiments obtained by a person having ordinary skill in the art based on the embodiments of the present disclosure without making any creative efforts shall fall within the protection scope of the disclosure.

Shapes and sizes of various film layers illustrated by the drawings do not reflect real proportions thereof in the display device, but are only intended to schematically describe contents of the present disclosure.

Figure 1:
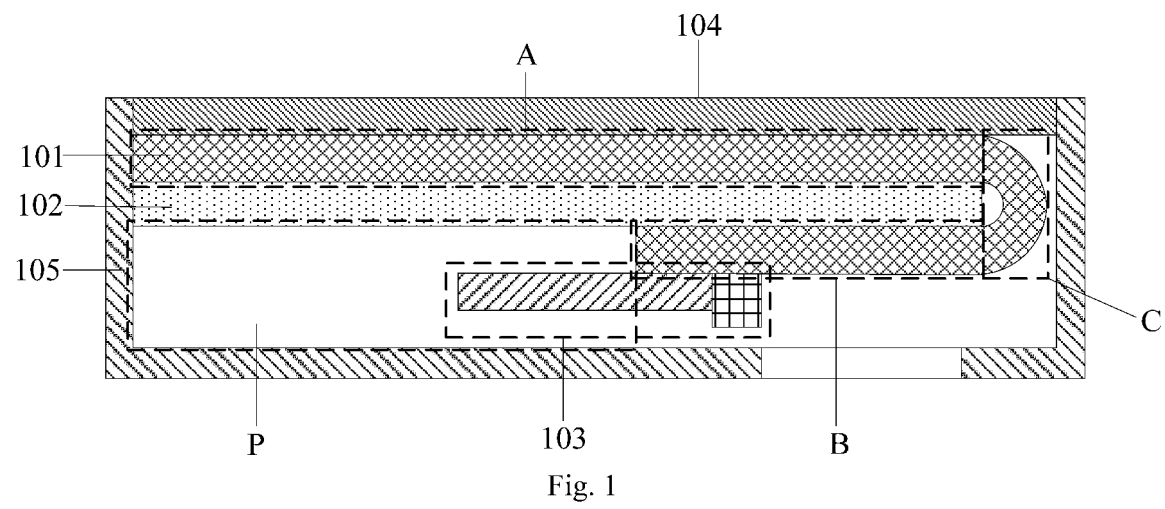
FIG. 1 is a structural schematic diagram I of a display device according to an embodiment of the disclosure.

As illustrated by FIG. 1, a display device according to an embodiment of the disclosure may include a middle frame 102 and an indiscrete flexible display panel 101 bending around the middle frame 102. The flexible display panel 101 may include a main display panel region A on one side of the middle frame 102, an auxiliary display panel region B on another side of the middle frame 102, and a bending region C bending around the middle frame 102 to connect the main display panel region A with the auxiliary display panel region B. In an embodiment, the part of the flexible display panel 101 corresponding to the main display panel region A may be used as a main display panel of the display device, the part of the flexible display panel 101 corresponding to the auxiliary display panel region B may be used as an auxiliary display panel of the display device, and the middle frame 102 is located between the main display panel and the auxiliary display panel. Furthermore, the main display panel and the auxiliary display panel are parts of the indiscrete flexible display panel 101. A light emitting side of the main display panel and a light emitting side of the auxiliary display panel are disposed back to back.

In the display device according to the embodiments of the disclosure, a dual-screen displaying function is realized by adopting one flexible display panel 101 by making use of the flexibility of the flexible display panel 101. Compared with the technical solution for realizing the dual-screen displaying by adopting two independent display panels in the related art, the display device according to the embodiments of the disclosure effectively reduces the cost and the difficulty of designing the entire device.

Furthermore, in the related art, the main display panel is generally a color screen, and the auxiliary display panel is generally an ink screen, so that the variety of displayable contents on the auxiliary display panel is greatly limited. In the display device according to the embodiment of the disclosure, as the main display panel and the auxiliary display panel are parts of the indiscrete flexible display panel 101, the main display panel and the auxiliary display panel are both color screens, and the display device has a better performance concerning colorization, displayable contents and etc.

In specific implementation, the flexible display panel may include a flexible electroluminescent display panel. Moreover, the flexible electroluminescent display panel may include a flexible organic light-emitting diode (hereinafter "OLED") display panel or a flexible quantum dot light emitting diode (hereinafter "QLED") display panel, and no limitations thereto are made here.

Figure 2:
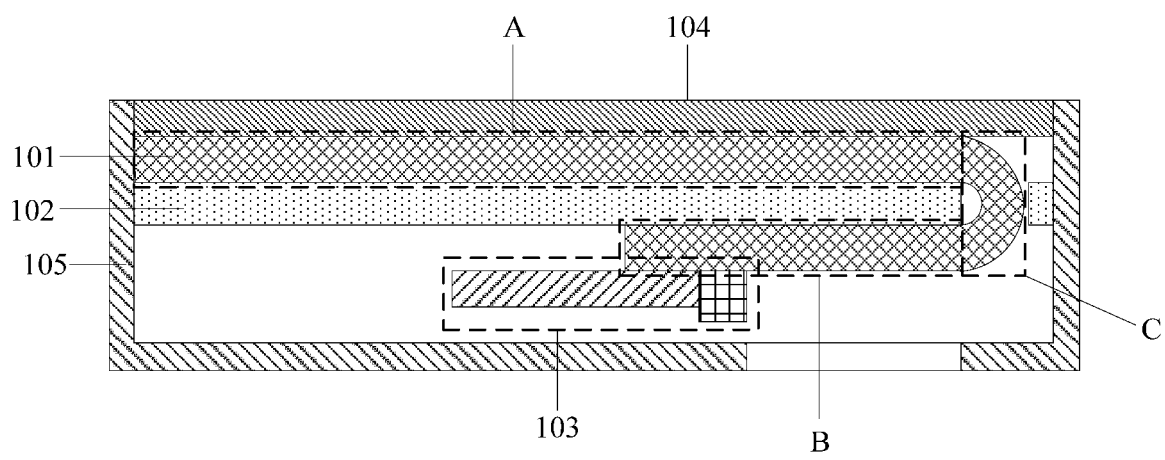
FIG. 2 is a structural schematic diagram II of a display device according to another embodiment of the disclosure.

In the display device according to an embodiment of the disclosure, the flexible display panel 101 may bend around the right end surface of the middle frame 102 directly as illustrated by FIG. 1, so that the main display panel region A where the main display panel is located and the auxiliary display panel region B where the auxiliary display panel is located are located on the upper and lower sides of the middle frame 102, respectively. Of course, an opening may be formed in the middle frame 102 as illustrated by FIG. 2, so that the bending region C runs through the opening of the middle frame 102. In this way, the main display panel region A and the auxiliary display panel region B can be located on the upper and lower sides of the middle frame 102, respectively, as well.

Figure 3:
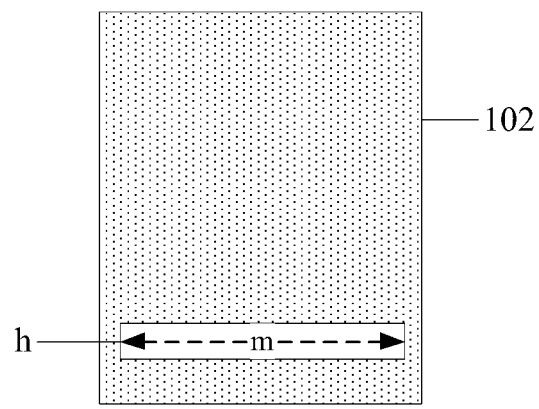
FIG. 3 is a structural schematic diagram I of a middle frame having an opening according to an embodiment of the disclosure.
Figure 4:
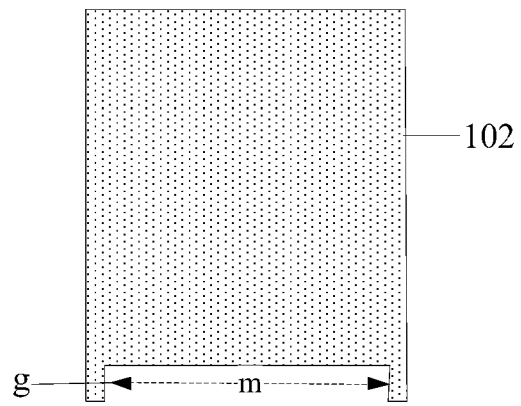
FIG. 4 is a structural schematic diagram II of a middle frame having an opening according to another embodiment of the disclosure.

In the display device according to the embodiment of the disclosure, the opening of the middle frame 102 may be a via hole h running through the middle frame 102, as shown in FIG. 3. Or the opening of the middle frame 102 may be a groove g at one end of the middle frame 102, as shown in FIG. 4. It can be understood that when the opening is the groove g located at one end of the middle frame 102, the sectional view of the corresponding display device is the same as the sectional view of the display device shown in FIG. 1.

Figure 5:
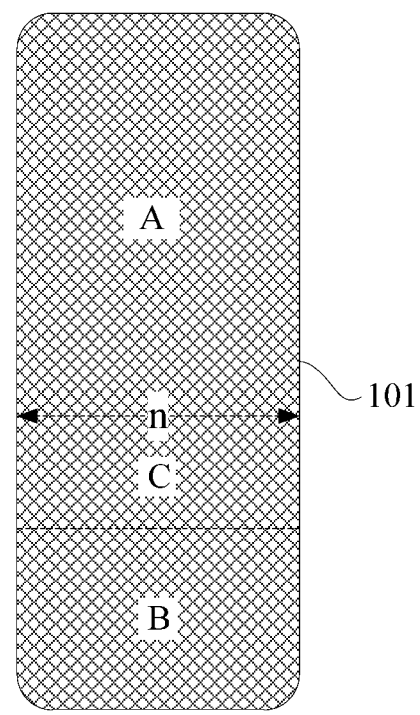
FIG. 5 is a structural schematic diagram of a flexible display panel before bending according to an embodiment of the disclosure.

In the display device according to the embodiment of the disclosure, as shown in FIGS. 3 to 5, a length m (as shown in FIGS. 3 and 4) of the opening of the middle frame 102 in an extending direction of a border line between the main display panel region A and the bending region C is equal to a length n (as shown in FIG. 5) of the border line between the main display panel region A and the bending region C. In this way, a short side (namely a side in the extending direction of the border line between the main display panel region A and the bending region C) of the flexible display panel 101 is just in contact with the left and right sides of the opening, thereby effectively fixing the flexible display panel 101.

Figure 6:
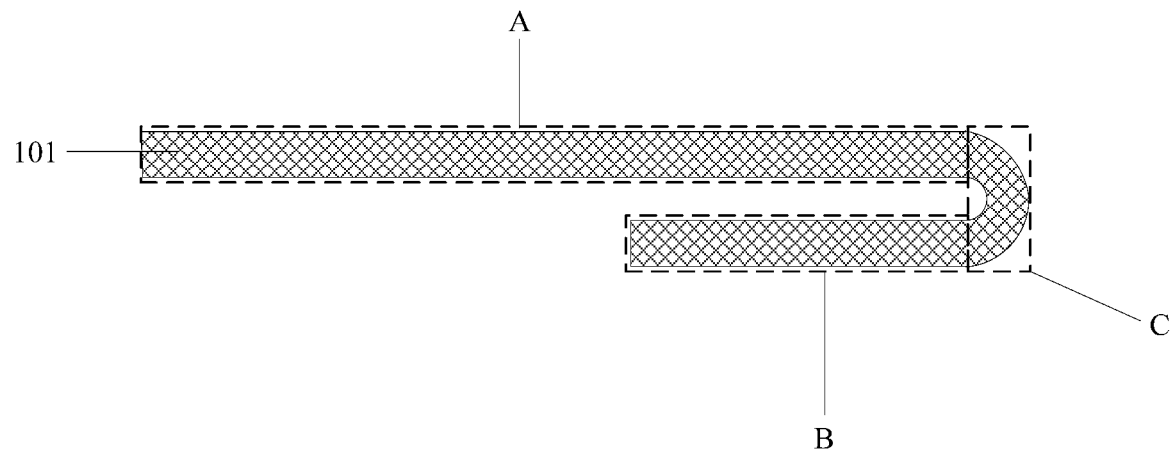
FIG. 6 is a structural schematic diagram I of a flexible display panel after bending according to an embodiment of the disclosure.
Figure 7:
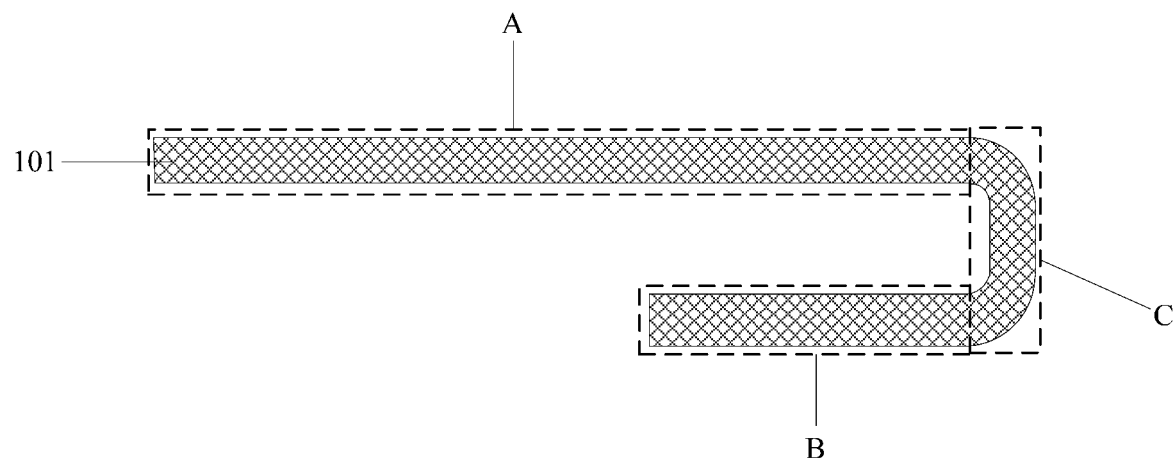
FIG. 7 is a structural schematic diagram II of a flexible display panel after bending according to another embodiment of the disclosure.
Figure 8:
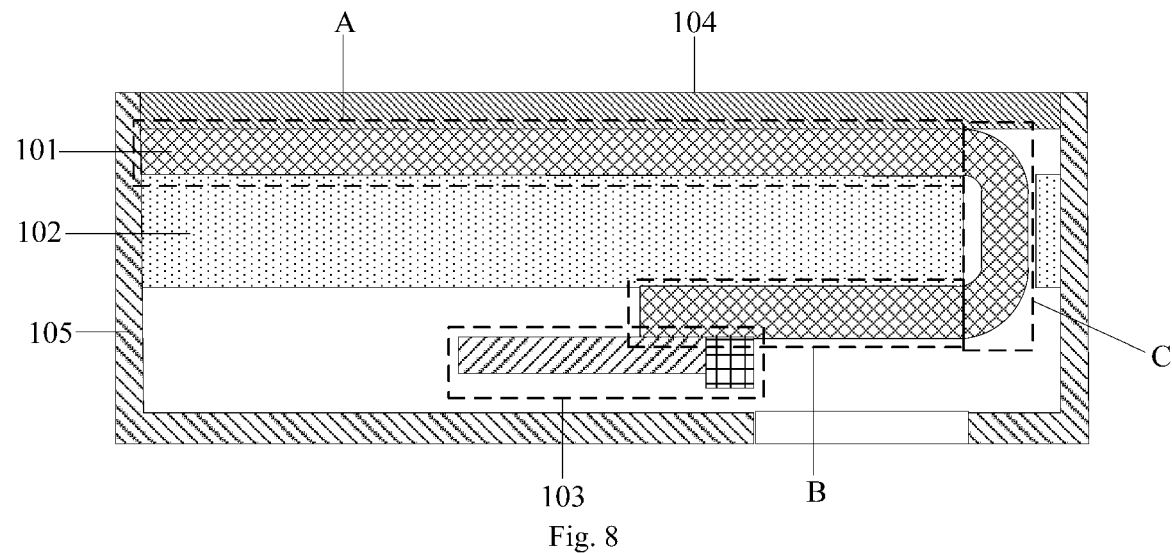
FIG. 8 is a structural schematic diagram III of a display device according to still another embodiment of the disclosure.
Figure 9:
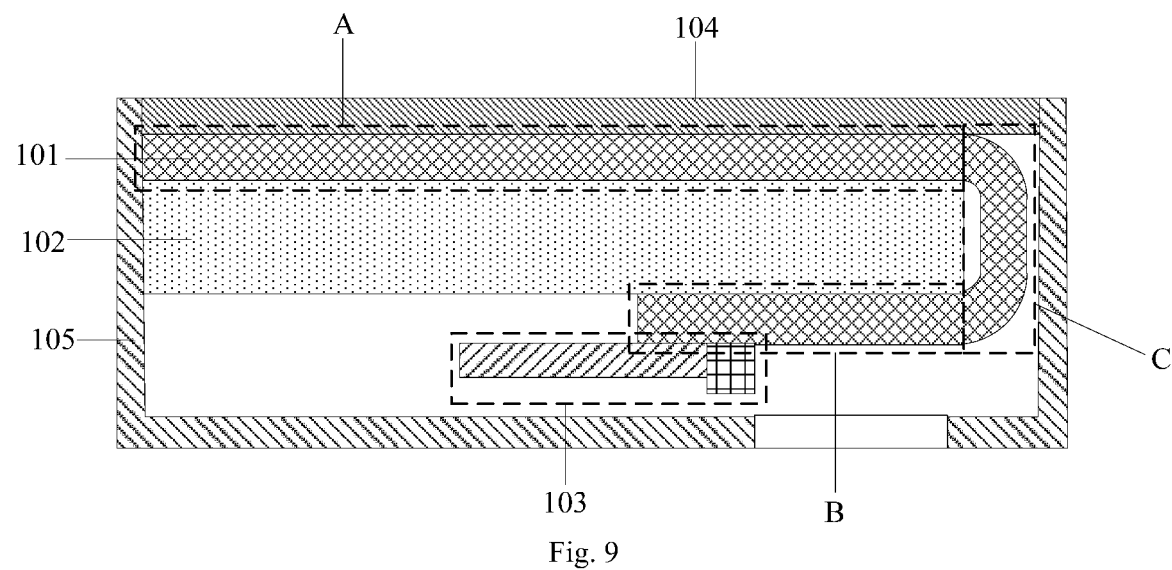
FIG. 9 is a structural schematic diagram IV of a display device according to still another embodiment of the disclosure.
Figure 10:
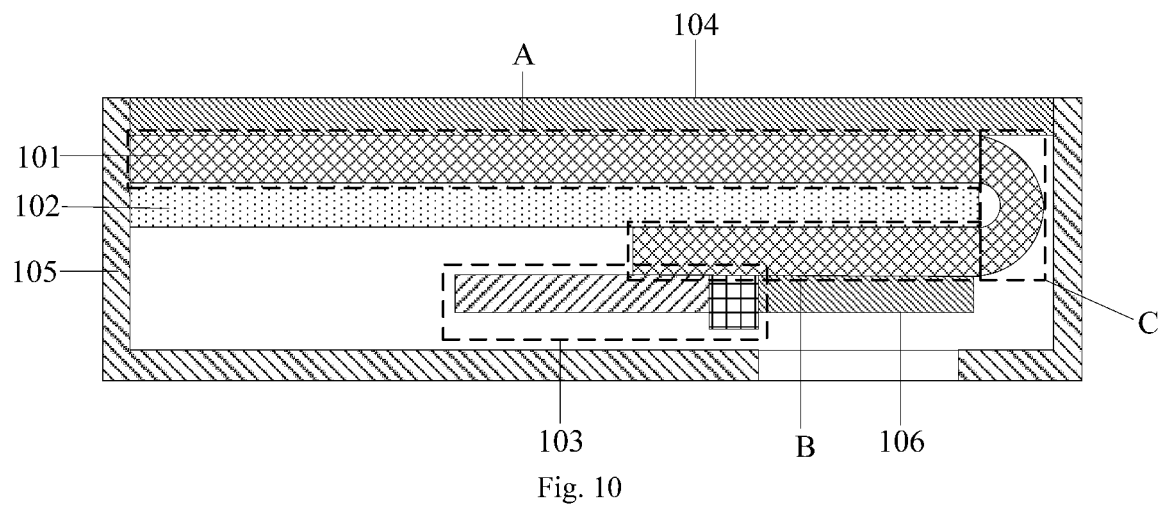
FIG. 10 is a structural schematic diagram V of a display device according to still another embodiment of the disclosure.
Figure 11:
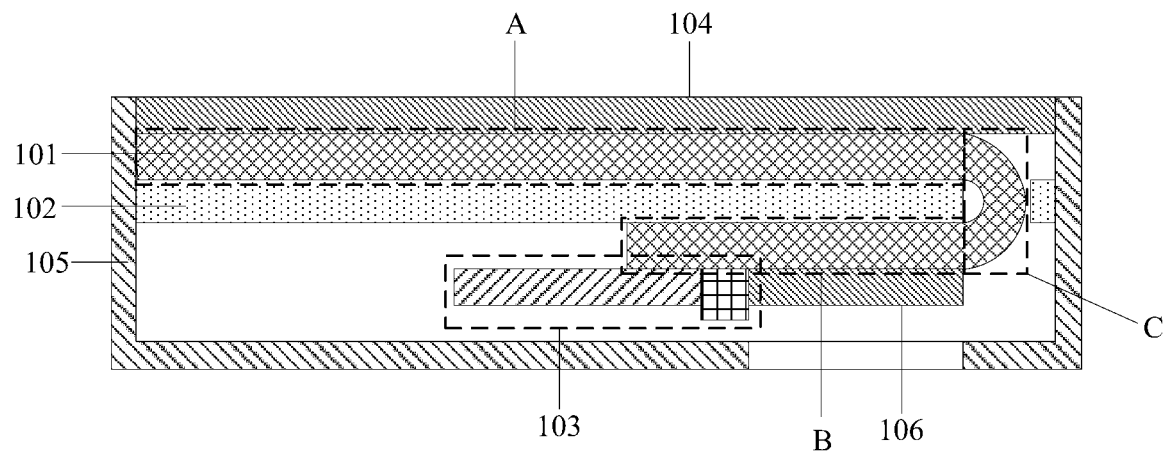
FIG. 11 is a structural schematic diagram VI of a display device according to still another embodiment of the disclosure.
Figure 12:
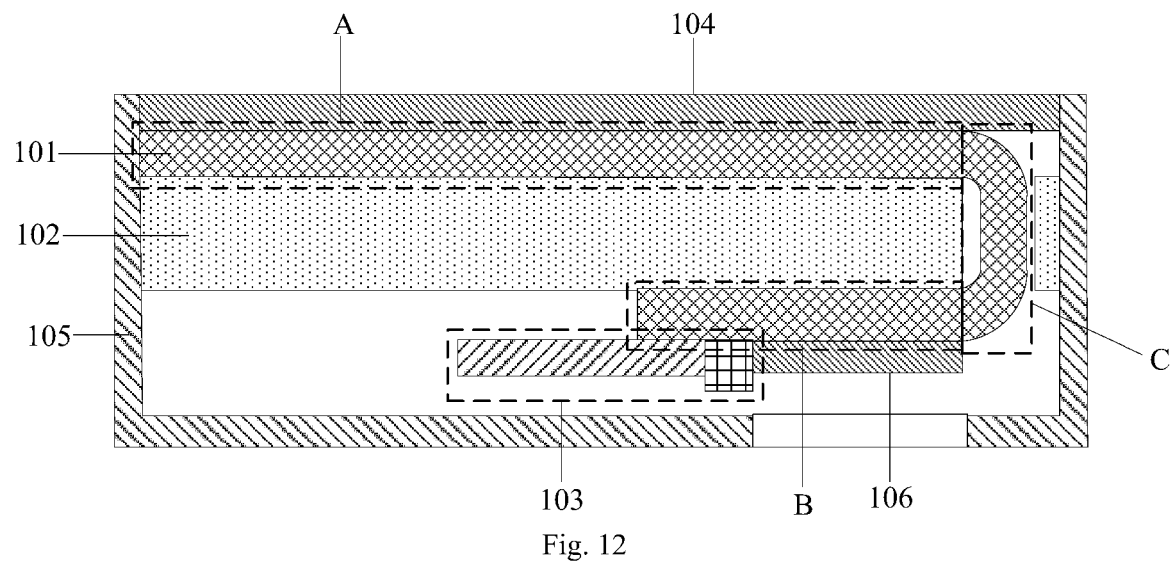
FIG. 12 is a structural schematic diagram VII of a display device according to still another embodiment of the disclosure.
Figure 13:
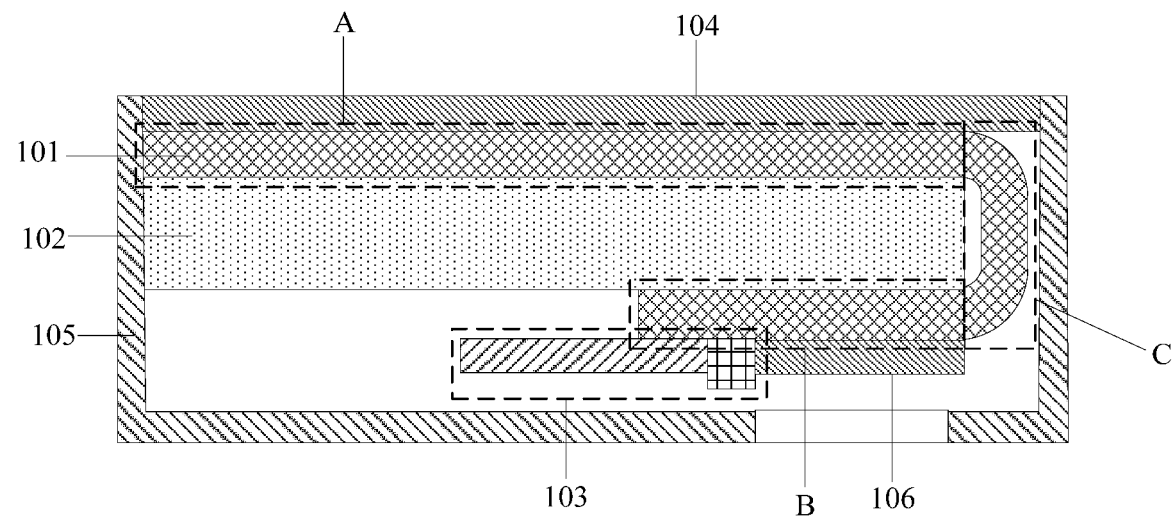
FIG. 13 is a structural schematic diagram VIII of a display device according to still another embodiment of the disclosure.
Figure 14:
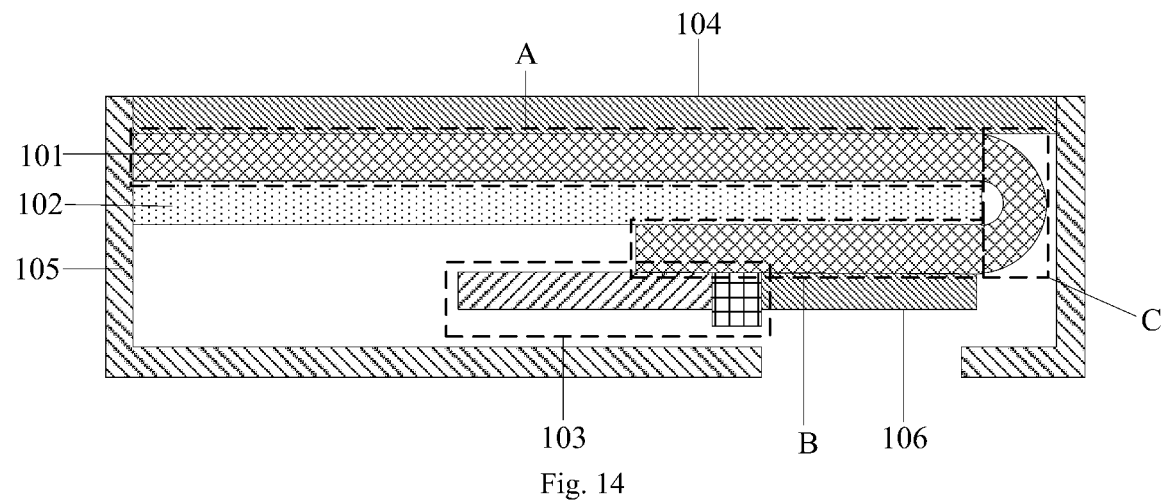
FIG. 14 is a structural schematic diagram IX of a display device according to still another embodiment of the disclosure.
Figure 15:
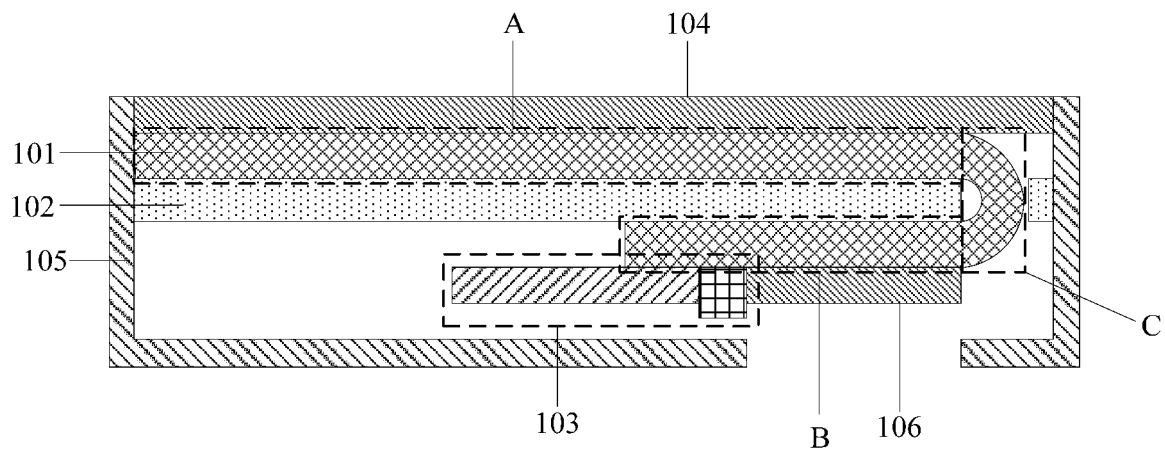
FIG. 15 is a structural schematic diagram X of a display device according to still another embodiment of the disclosure.
Figure 16:
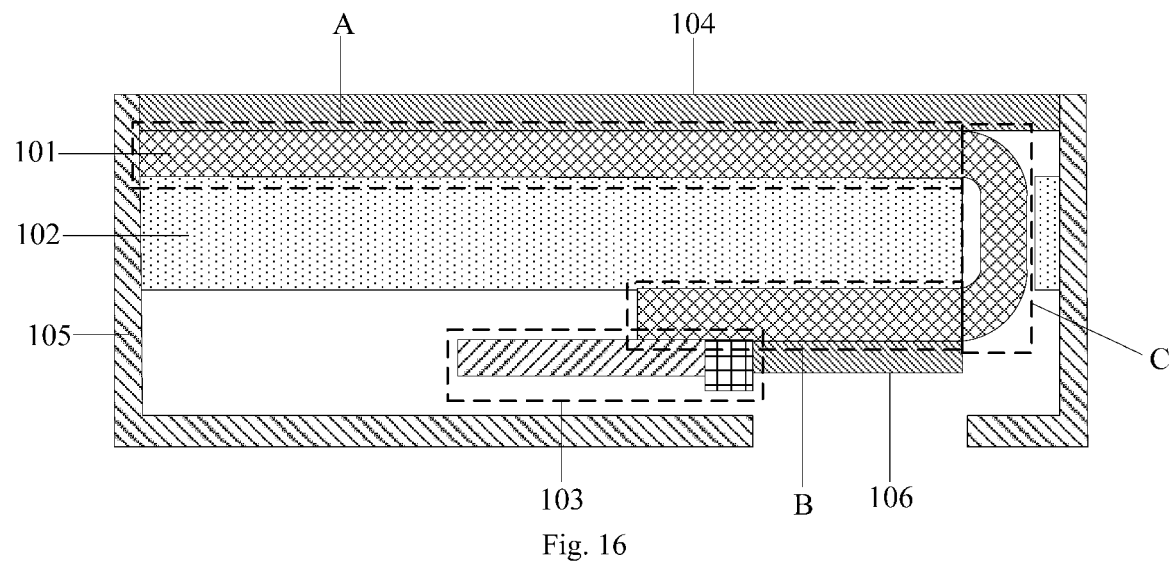
FIG. 16 is a structural schematic diagram XI of a display device according to still another embodiment of the disclosure.
Figure 17:
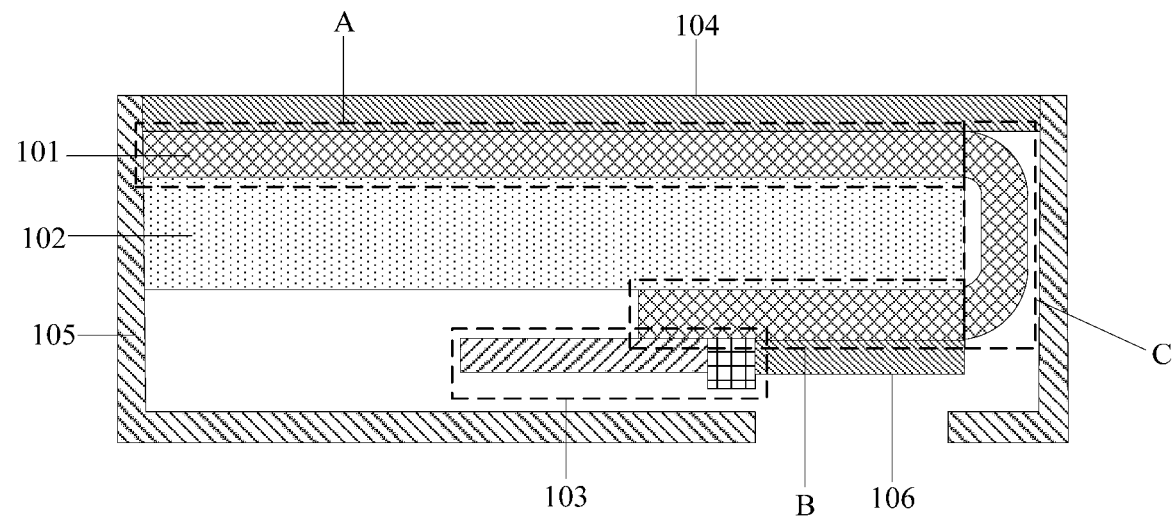
FIG. 17 is a structural schematic diagram XII of a display device according to still another embodiment of the disclosure.
Figure 18:
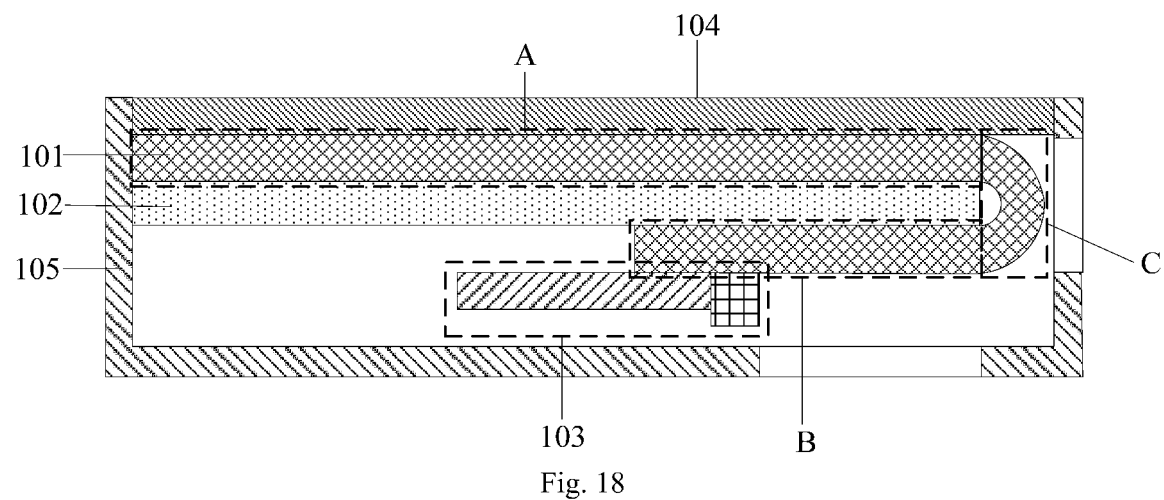
FIG. 18 is a structural schematic diagram XIII of a display device according to still another embodiment of the disclosure.
Figure 19:
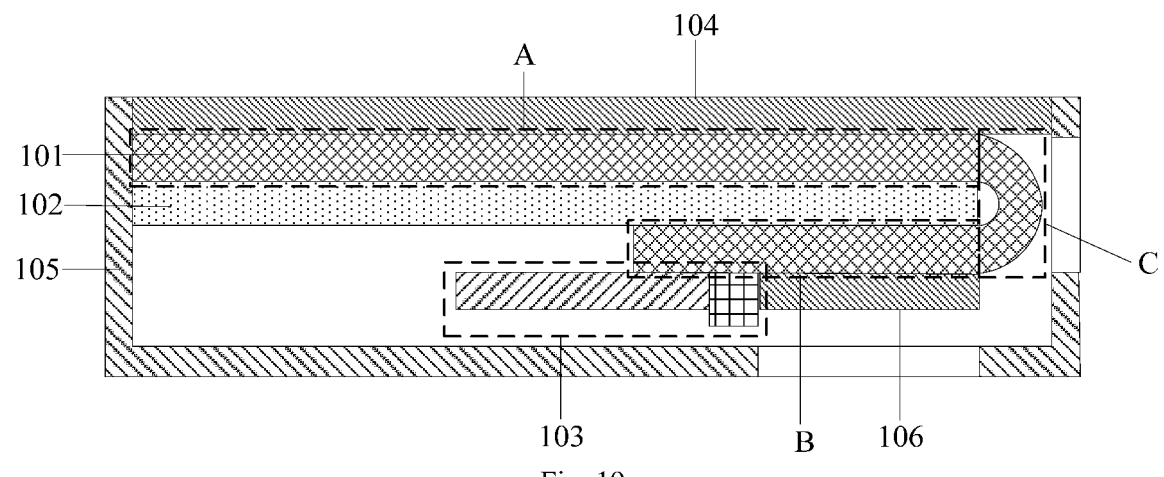
FIG. 19 is a structural schematic diagram XIV of a display device according to still another embodiment of the disclosure.
Figure 20:
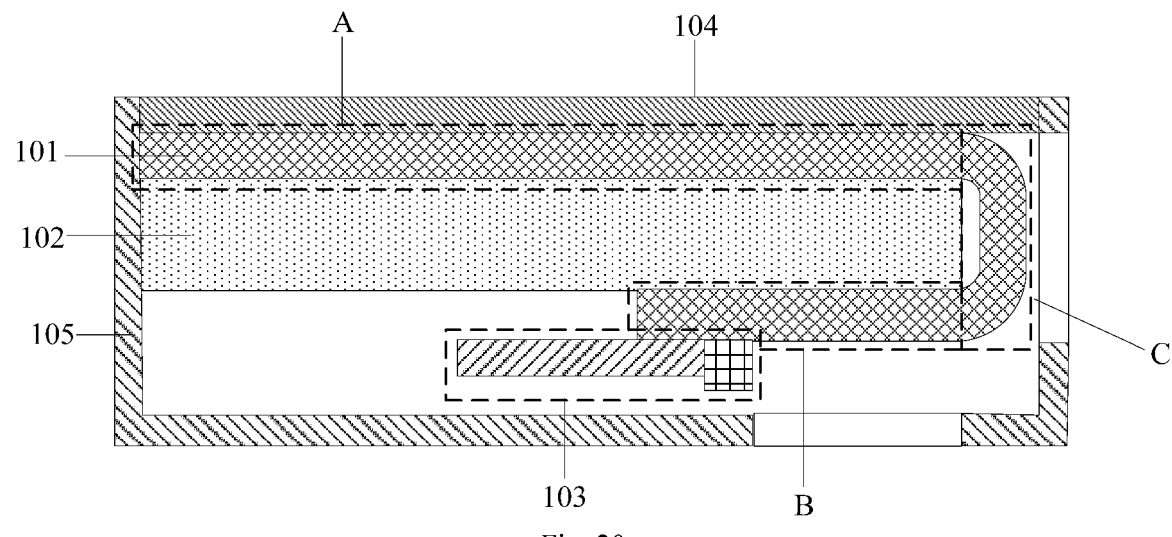
FIG. 20 is a structural schematic diagram XV of a display device according to still another embodiment of the disclosure.
Figure 21:
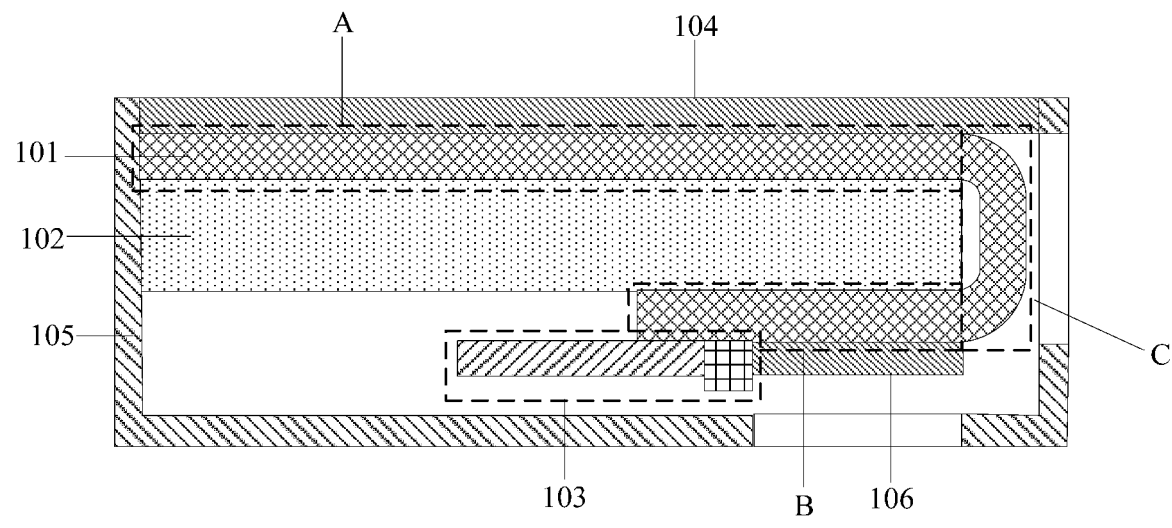
FIG. 21 is a structural schematic diagram XVI of a display device according to still another embodiment of the disclosure.
Figure 22:
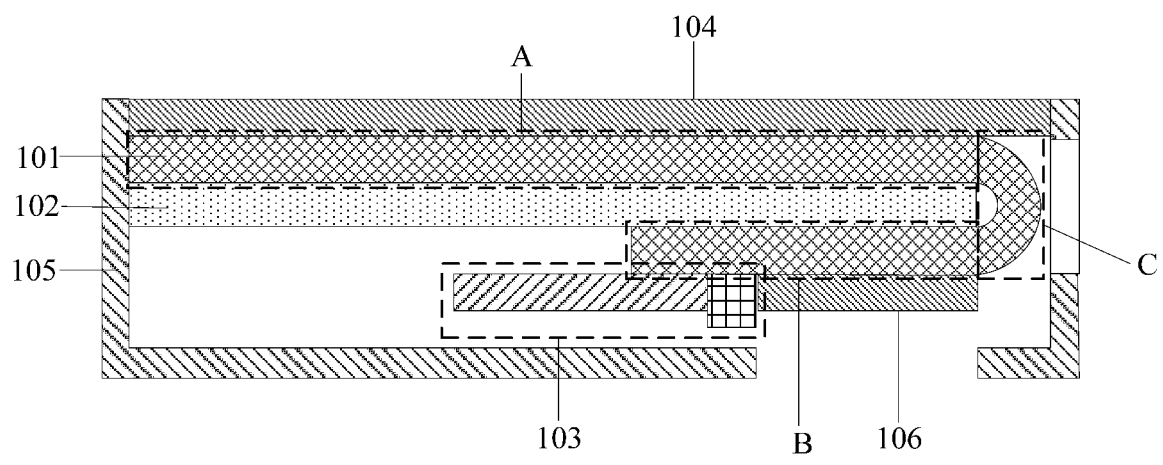
FIG. 22 is a structural schematic diagram XVII of a display device according to still another embodiment of the disclosure.
Figure 23:
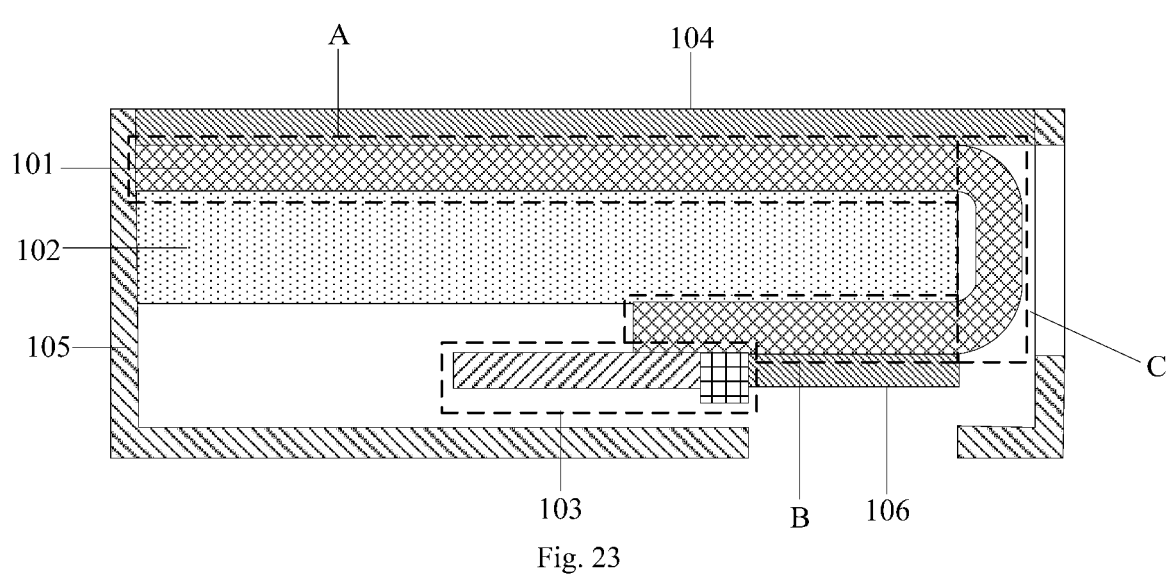
FIG. 23 is a structural schematic diagram XVIII of a display device according to still another embodiment of the disclosure.

In the display device according to an embodiment of the disclosure, a cross-section of a part of the flexible display panel 101 corresponding to the bending region C may have a semicircular shape as shown in FIG. 6. As can be inferred from FIG. 6, a cutting plane containing the cross-section is parallel to a line perpendicular to the middle frame, where the line joins bottom of the part corresponding to the bending region to the middle frame. The cross-section of the part of the flexible display panel 101 corresponding to the bending region C in the display device as shown in either FIG. 1 or 2 has the semicircular shape. Or the cross-section of the part of the flexible display panel 101 corresponding to the bending region C may have a U-shape composed of a plane and two curved surfaces located at two ends of the plane as shown in FIG. 7. The cross-section of the part of the flexible display panel 101 corresponding to the bending region C in the display device as shown in either FIG. 8 or 9 has the U-shape. Of course, the cross-section of the part corresponding to the bending region C may also have other shapes, and no specific limitations thereto are made here.

Generally, thickness of the display device is 7 to 8 mm. The display device having the thickness of 8 mm is taken for example. When the cross-section of the part of the flexible display panel 101 corresponding to the bending region C bends into the semicircular shape as shown in FIG. 6, the bending curvature radius may be 4 mm. When the cross-section of the part of the flexible display panel 101 corresponding to the bending region C bends into the U-shape as shown in FIG. 7, if the plane is to be 4 mm thick, radius of each of the two curved surfaces at the two ends of the plane may be 2 mm.

The two display panels in the current dual-screen display device realize independent displaying by depending on respective driver circuits, leading to relatively high cost. In order to reduce the cost, as shown in FIG. 1, the display device according to the embodiment of the disclosure may further include a driver circuit 103. The auxiliary display panel region B may include a display region and a binding region. The binding region is located on a side of the display region which is away from the bending region C. The driver circuit 103 is coupled to the flexible display panel 101 through the binding region, so as to drive the flexible display panel 101. In this way, the indiscrete flexible display panel 101 including the main display panel located in the main display panel region A and the auxiliary display panel located in the auxiliary display panel region B is driven by one driver circuit 103, thereby reducing the cost. Furthermore, it is not necessary to arrange a driver circuit on the side where the main display panel region A is located for driving the main display panel independently, so a relatively narrow bezel design may be realized. The driver circuit 103 may include due components known by those having ordinary skill in the art, such as a driver chip and a flexible circuit board.

Figure 27:
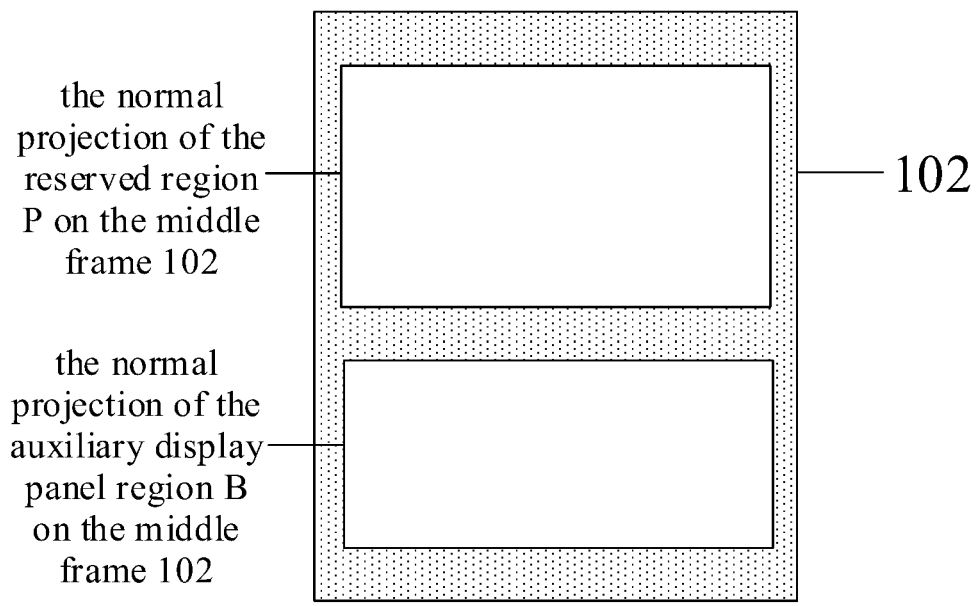
FIG. 27 is another structural schematic diagram of the display device illustrated by FIG. 1.

In the display device according to the embodiments of the disclosure, in order to supply power to the driver circuit 103, as shown in FIGS. 1 and 27, the side, provided with the auxiliary display panel region B, of the middle frame 102 is also provided with a reserved region P for mounting a battery. A normal projection of the reserved region P on the middle frame 102 and a normal projection of the auxiliary display panel region B on the middle frame 102 do not overlap. Furthermore, when the display device is a mobile phone, a mobile phone platform commonly used in the prior art such as a Snapdragon 845 processor may also be installed in the reserved region P.

In the display device according to the embodiments of the disclosure, in order to protect the main display panel region A, as shown in FIG. 1, the display device may further include a first transparent cover plate 104 located on a side, away from the middle frame 102, of the main display panel region A.

In the display device according to the embodiments of the disclosure, as shown in FIG. 1, the display device may further include a housing 105 on each side surface of the flexible display panel 101, each side surface of the middle frame 102 and a side, away from the middle frame 102, of the auxiliary display panel region B. A part, corresponding to the display region in the auxiliary display panel region B, of the housing 105 is transparent. In this way, internal components of the display device may be effectively protected, and a picture displayed by the auxiliary display panel region B may be watched. Moreover, in order to better protect the auxiliary display panel region B, as shown in FIGS. 10 to 13, the display device may further include a second transparent cover plate 106 covering the display region in the auxiliary display panel region B.

Of course, in the display device according to the embodiments of the disclosure, as shown in FIGS. 14 to 17, the housing 105 may be hollow at the position corresponding to the display region in the auxiliary display panel region B, and a second transparent cover plate 106 covering the display region in the auxiliary display panel region B is further disposed, so that the picture displayed by the auxiliary display panel region B may be watched and the auxiliary display panel in the auxiliary display panel region B may be protected.

It can be understood that in the display device according to the embodiments of the disclosure, the bending region C of the flexible display panel 101 may be configured for displaying. In order to make a picture displayed by the bending region C able to be watched, as shown in FIGS. 18 to 23, a part of the housing 105 corresponding to the bending region C is transparent. When not configured for displaying, the bending region C has no pixels (namely the bending region C has no luminous layers), and only grid lines, data lines and the like are maintained to transmit a driver signal, forwarded by the auxiliary display panel region B and output by the driver circuit 103, to the main display panel region A.

Figure 24:
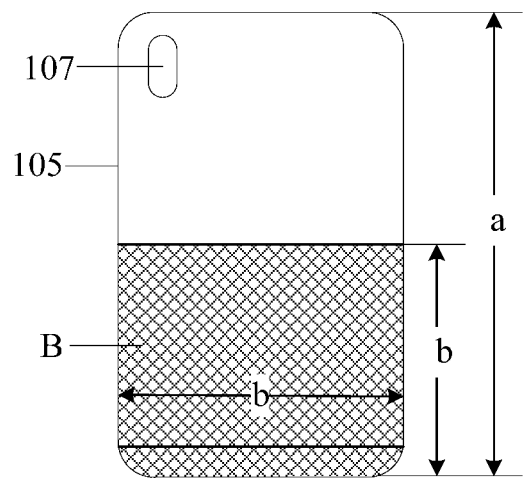
FIG. 24 is a structural schematic diagram XIX of a display device according to still another embodiment of the disclosure.

In the display device according to the embodiment of the disclosure, as shown in FIG. 24, the display device may further include a camera 107 located on a part of the housing 105 on the side, away from the middle frame 102, of the auxiliary display panel region B. Furthermore, in order not to affect the picture displayed by the auxiliary display panel region B to be watched, a normal projection of the camera 107 on the housing 105 and a normal projection of the auxiliary display panel region B on the housing 105 do not overlap. Furthermore, as the camera 107 is located on the side, provided with the auxiliary display panel region B, of the display device, images such as a selfie acquired by the camera 107 may be displayed on the auxiliary display panel region B. Therefore, as shown in FIG. 25, no camera 107 needs to be arranged on the side, provided with the main display panel region A, of the display device, and full-screen displaying at a screen-to-body ratio of 100% is realized on the main display panel region A.

In the display device according to the embodiments of the disclosure, the main display panel region A with full-screen displaying may be used to display contents required to be watched by a user, for example, shortcut icons such as wifi and Bluetooth, reminders of time, weather and schedules, and videos such as films. The auxiliary display panel region B may be configured for displaying electronic books and may be further configured for handling of social information such as WeChat messages and phone calls. Therefore, when a content such as a film or a game is displayed on the main display panel region A, social information such as a WeChat message or a phone call may be handled on the auxiliary display panel region B, so that the content such as the film or the game displayed on the main display panel region A is not interrupted, and the flow experience of the user is greatly enhanced.

In addition, in the display device according to the embodiments of the disclosure, a refreshing rate of the main display panel region and a refreshing rate of the auxiliary display panel region may be different. For example, the refreshing rate of the main display panel region and the refreshing rate of the auxiliary display panel region may be controlled to be different through a clock signal of a timing controller (hereinafter "TCON"). For example, when the main display panel region is used, the refreshing rate of the main display panel region is 60 Hz, and the refreshing rate of the auxiliary display panel region is 10 Hz, thereby greatly reducing power consumption.

Figure 25:
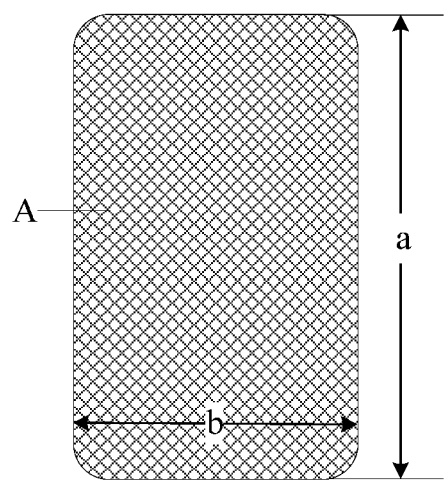
FIG. 25 is a structural schematic diagram XX of a display device according to still another embodiment of the disclosure.

Furthermore, in the display device according to the embodiments of the disclosure, as shown in FIG. 25, if the size of the main display panel region A in the full-screen displaying is 5.8 inches (18:9), the side a may be 143.9 mm, the side b may be 70.9 mm, and the resolution may be 2436*1125. The auxiliary display panel region B may be square, as shown in FIG. 24, and the size of the auxiliary display panel region B may be 3.9 inches (9:9), so the side b may be 70.9 mm, and resolution may be 1125*1125. The bending region C adopts the semicircular structure shown in FIG. 6, and the length of the part of the flexible display panel corresponding to the bending region C may be $4*\pi$, which is approximately equal to 12.56 mm, and the entire length of the flexible display panel 101 may be $143.9+70.9+4*\pi$, which equals to 227.37 mm, so the flexible display panel 101 before bending has a size of about 9.4 inches (29:9) and a resolution of 3849*1125. Of course, the above-mentioned designs are only a part of the designs of the main display panel region A, the auxiliary display panel region B and the bending region C. In specific implementation, the design methods above may be referred to and the final design may be made according to actual requirements. No specific limitations thereto are made here.

Based on the same inventive conception, an embodiment of the disclosure provides a manufacturing method of the display device. The principle of the manufacturing method for solving problems is similar to the principle of the display device for solving problems, so for implementation of the manufacturing method according to embodiments of the disclosure, the implementation of the display device according to the embodiments of the disclosure may be referred to, and repeated contents are no longer described.

Figure 26:
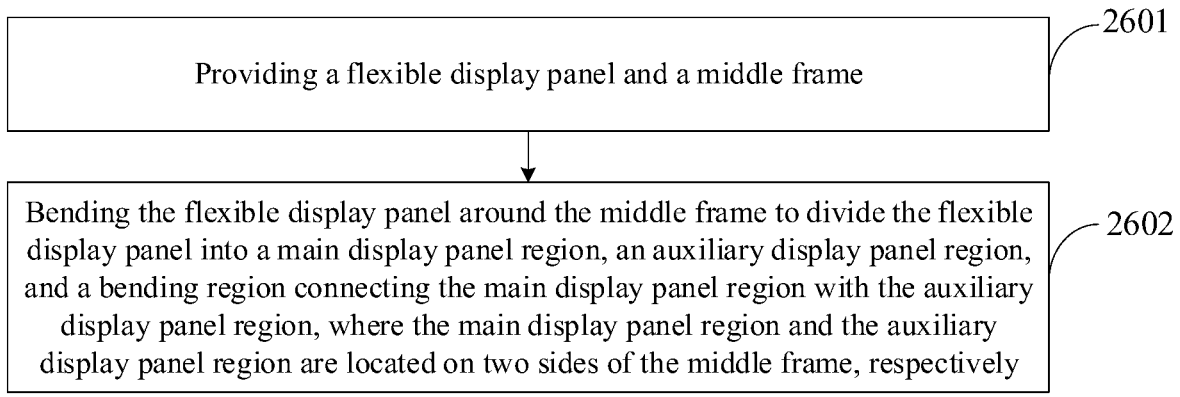
FIG. 26 is a flowchart of a manufacturing method of a display device according to an embodiment of the disclosure.

As shown in FIG. 26, the manufacturing method of the display device according to the embodiment of the disclosure includes following operations 2601 and 2602.

2601: Providing a flexible display panel and a middle frame.

2602: Bending the flexible display panel around the middle frame to divide the flexible display panel into a main display panel region, an auxiliary display panel region, and a bending region connecting the main display panel region with the auxiliary display panel region, where the main display panel region and the auxiliary display panel region are located on two sides of the middle frame, respectively.

The main display panel region is configured as a main display panel, and the auxiliary display panel region is configured as an auxiliary display panel.

During specific implementation, a cross-section of the bending region may have a semicircular shape or a U-shape. A cutting plane containing the cross-section is parallel to a line perpendicular to the middle frame, where the line joins bottom of the bending region to the middle frame.

It should be noted that herein relation terms such as first and second are only used to distinguish one entity or operation from another entity or operation, but do not necessarily require or imply that these entities or operations have any actual relations or orders.

According to the display device and the manufacturing method thereof according to the embodiments of the disclosure, the display device includes the middle frame and the indiscrete flexible display panel bending around the middle frame. The flexible display panel includes the main display panel region where the main display panel is located, the auxiliary display panel region where the auxiliary display panel is located, and the bending region bending around the middle frame to connect the main display panel region with the auxiliary display panel region. Since the dual-screen displaying function is realized by adopting one flexible display panel, the cost and the difficulty for designing the entire device are effectively reduced.

Obviously, those having ordinary skill in the art can make various changes and modifications to the present disclosure without departing from the spirit and scope of the disclosure. Therefore, it is intended that the disclosure covers such modifications and variations if these modifications and variations fall within the scopes of claims of the disclosure and equivalent technologies of the claims.

The invention claimed is:
1. A display device, comprising:
a middle frame; and
an indiscrete flexible display panel bending around the middle frame, wherein, the flexible display panel comprises a main display panel region on one side of the middle frame, an auxiliary display panel region on another side of the middle frame, and a bending region bending around the middle frame to connect the main display panel region with the auxiliary display panel region, wherein a via hole runs through the middle frame and the bending region runs through the via hole.

2. The display device according to claim 1, wherein a length of the via hole in an extending direction of a border line between the main display panel region and the bending region is equal to a length of the border line between the main display panel region and the bending region.

3. The display device according to claim 1, wherein a cross-section of a part of the flexible display panel corresponding to the bending region has a semicircular shape or a U-shape, wherein a cutting plane containing the cross-section is parallel to a line perpendicular to the middle frame and the line joins bottom of the part corresponding to the bending region to the middle frame.

4. The display device according to claim 1, further comprising a driver circuit; wherein
the auxiliary display panel region comprises a display region and a binding region;
the binding region is located on a side of the display region away from the bending region; and
the driver circuit is coupled to the flexible display panel through the binding region, so as to drive the flexible display panel.

5. The display device according to claim 1 further comprising a first transparent cover plate located on a side of the main display panel region away from the middle frame.

6. The display device according to claim 1, further comprising:
a second transparent cover plate; and
a housing on each side surface of the flexible display panel, each side surface of the middle frame and a side of the auxiliary display panel region away from the middle frame;
wherein the housing is hollow at a position corresponding to the display region in the auxiliary display panel region, and the second transparent cover plate covers the display region in the auxiliary display panel region.

7. The display device according to claim 1, further comprising a housing located on each side surface of the flexible display panel, each side surface of the middle frame, and a side, away from the middle frame, of the auxiliary display panel region;
wherein a part of the housing corresponding to the display region in the auxiliary display panel region is transparent.

8. The display device according to claim 6, wherein a part, corresponding to the bending region, of the housing is transparent.

9. The display device according to claim 6, further comprising a camera on a part of the housing located on the side, away from the middle frame, of the auxiliary display panel region;
wherein a normal projection of the camera on the housing and a normal projection of the auxiliary display panel region on the housing do not overlap.

10. The display device according to claim 1, wherein a refreshing rate of the main display panel region is different from a refreshing rate of the auxiliary display panel region.

11. The display device according to claim 1, wherein the side, provided with the auxiliary display panel region, of the middle frame is also provided with a reserved region for mounting a battery; and a normal projection of the reserved region on the middle frame and a normal projection of the auxiliary display panel region on the middle frame do not overlap.

12. A manufacturing method of the display device according to claim 1, comprising:
providing the flexible display panel and the middle frame; and
bending the flexible display panel around the middle frame to divide the flexible display panel into the main display panel region, the auxiliary display panel region and the bending region for connecting the main display panel region with the auxiliary display panel region, wherein the main display panel region and the auxiliary display panel region are located on two sides of the middle frame, respectively.

13. The display device according to claim 7, wherein a part, corresponding to the bending region, of the housing is transparent.

14. The display device according to claim 7, further comprising a camera on a part of the housing located on the side, away from the middle frame, of the auxiliary display panel region;
wherein a normal projection of the camera on the housing and a normal projection of the auxiliary display panel region on the housing do not overlap.

* * * * *